US009818044B2

(12) United States Patent
Koch et al.

(10) Patent No.: US 9,818,044 B2
(45) Date of Patent: Nov. 14, 2017

(54) CONTENT UPDATE SUGGESTIONS

(71) Applicant: Adobe Systems Incorporated, San Jose, CA (US)

(72) Inventors: Zeke Koch, San Francisco, CA (US); Gavin Stuart Peter Miller, Los Altos, CA (US); Jonathan W. Brandt, Santa Cruz, CA (US); Nathan A. Carr, San Jose, CA (US); Walter Wei-Tuh Chang, San Jose, CA (US); Scott D. Cohen, Sunnyvale, CA (US); Hailin Jin, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/938,781

(22) Filed: Nov. 11, 2015

(65) Prior Publication Data

US 2017/0132490 A1    May 11, 2017

(51) Int. Cl.
*G06K 9/68* (2006.01)
*G06K 9/62* (2006.01)
*G06K 9/80* (2006.01)
*G06T 11/60* (2006.01)

(52) U.S. Cl.
CPC ........... *G06K 9/6202* (2013.01); *G06K 9/80* (2013.01); *G06T 11/60* (2013.01); *G06T 2200/24* (2013.01)

(58) Field of Classification Search
USPC ....... 382/218, 276, 144, 172, 199; 244/3.19; 342/13, 62; 435/6.15, 91.2; 536/24.33; 704/7, 9
See application file for complete search history.

(56) References Cited

U.S. PATENT DOCUMENTS

| | | | |
|---|---|---|---|
| 6,011,864 A * | 1/2000 | Wu | G06T 9/007 |
| | | | 382/172 |
| 9,111,413 B2 * | 8/2015 | Gagner | G07F 17/3209 |
| 9,483,159 B2 * | 11/2016 | Myslinski | G06F 1/163 |
| 2002/0118210 A1 | 8/2002 | Yuasa et al. | |
| 2009/0287657 A1 | 11/2009 | Bennett | |

(Continued)

OTHER PUBLICATIONS

"Pre-Interview Communication", U.S. Appl. No. 14/938,628, dated Mar. 22, 2017, 3 pages.

(Continued)

*Primary Examiner* — Anh H Do
(74) *Attorney, Agent, or Firm* — Wolfe-SBMC

(57) ABSTRACT

Content update and suggestion techniques are described. In one or more implementations, techniques are implemented to generate suggestions that are usable to guide creative professionals in updating content such as images, video, sound, multimedia, and so forth. A variety of techniques are usable to generate suggestions for the content professionals. In one example, suggestions are based on shared characteristics of images licensed by users of a content sharing service, e.g., licensed by the users. In another example, suggestions are based on metadata of the images licensed by the users, the metadata describing characteristics of how the images are created. These suggestions are then used to guide transformation of a user's image such that the image exhibits these characteristics and thus has an increased likelihood of being desired for licensing by customers of the service.

20 Claims, 7 Drawing Sheets

(56) References Cited

U.S. PATENT DOCUMENTS

| | | |
|---|---|---|
| 2011/0101104 A1 | 5/2011 | Flynn et al. |
| 2011/0102544 A1 | 5/2011 | Kim |
| 2012/0054638 A1 | 3/2012 | Ingoldby et al. |
| 2013/0070050 A1 | 3/2013 | Ha et al. |
| 2014/0211034 A1 | 7/2014 | Tanaka |
| 2014/0229873 A1 | 8/2014 | Tremblay et al. |
| 2016/0259992 A1 | 9/2016 | Knodt et al. |
| 2017/0131876 A1 | 5/2017 | Koch et al. |
| 2017/0131877 A1 | 5/2017 | Koch et al. |
| 2017/0132252 A1 | 5/2017 | Koch et al. |
| 2017/0132290 A1 | 5/2017 | Koch et al. |
| 2017/0132425 A1 | 5/2017 | Koch et al. |

OTHER PUBLICATIONS

"Pre-Interview Communication", U.S. Appl. No. 14/938,628, dated Apr. 3, 2017, 3 pages.
"Pre-Interview Communication", U.S. Appl. No. 14/938,660, dated Apr. 7, 2017, 3 pages.
"First Action Interview Office Action", U.S. Appl. No. 14/938,628, dated Jul. 26, 2017, 3 pages.
"First Action Interview Office Action", U.S. Appl. No. 14/938,660, dated Aug. 17, 2017, 3 pages.

\* cited by examiner

CONTENT UPDATE SUGGESTIONS

BACKGROUND

Content sharing services have been developed as a technique to provide an online marketplace for creative professionals to sell content, such as images. A creative professional, for instance, may capture or create images that are exposed via the content sharing services to potential customers such as marketing professionals, casual users, and so on. For example, a creative professional may capture an image of coworkers conversing next to a watercooler. The image is then uploaded and tagged for availability as part of the content sharing service such that a marketing professional performing a search for "office" and "watercooler" may locate the image. The content sharing service also includes functionality to make the image available for licensing in response to payment of a fee, e.g., as part of a subscription service, pay per use, and so forth.

In conventional digital online marketplaces, creative professionals may upload hundreds and even thousands of images to provide images that have a likelihood of being licensed by customers of the content sharing service. Over time, however, the tastes of these customers change, and therefore these images may become stale and no longer desired for licensing. For example, the customers' tastes may change from a "clean and pressed" look for people in the images to a "wrinkled and worn" look. Thus, images exhibiting the former characteristics are no longer desired by these customers and as such a vast number of images made available by the content sharing service may no longer be relevant or desired by customers of the service at later points in time. This may have a significant impact on the creative professionals as well as customers desiring images from these professionals, such as by cluttering search results.

SUMMARY

Content update and suggestion techniques are described. In one or more implementations, techniques are implemented to generate suggestions that are usable to guide creative professionals in updating content such as images, video, sound, multimedia, and so forth. A variety of techniques are usable to generate suggestions for the content professionals. In one example, suggestions are based on shared characteristics of images licensed by users of a content sharing service, e.g., licensed by the users. In another example, suggestions are based on metadata of the images licensed by the users, the metadata describing characteristics of how the images are created. These suggestions are then used to guide transformation of a user's image such that the image exhibits these characteristics and thus has an increased likelihood of being desired for licensing by customers of the service. A variety of other examples are also contemplated and described in the following.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
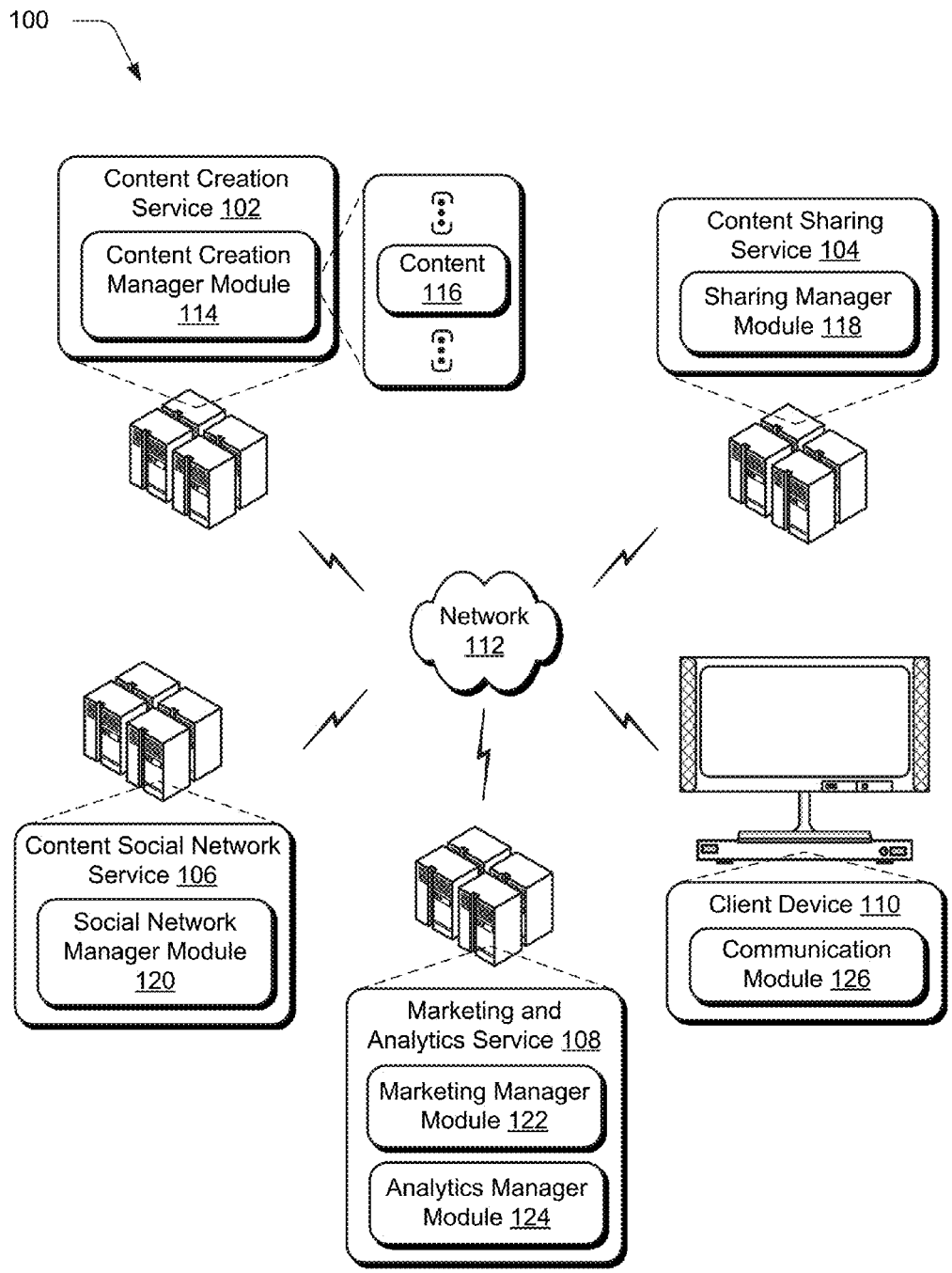
FIG. 1 is an illustration of an environment in an example implementation that is operable to employ content update suggestion techniques described herein.

Content sharing services provided via a digital environment are configured to unite content from creative professionals with consumers of the content, such as marketers. An example of this is the content sharing service is Adobe Stock™ by Adobe®, via which images are made available, e.g., via licensing, for users of the service. The images, for instance, may be made available as stock photos, including macro-stock images that are generally high-priced and exclusive, micro-stock which is relatively low priced and made available to wide range of consumers, and mid-stock which is priced between the two.

While serving as a valuable technique in which creative professional may be united with potential consumers, images made available via conventional content sharing services of the digital environment may become stale. This is typically due to changing tastes of customers of the content sharing service. As a result, this results in limiting an amount of time in which images provided by creative professionals are considered relevant, thus decreasing the professional's potential investment in these images. This may also result in oversaturation of the content sharing service with these potentially stale images, which may have a corresponding decrease in efficiency and accuracy of a likelihood of a search result having images of interest to potential customers of the service.

Accordingly, a digital environment is described in the following that supports content update suggestion techniques and systems. In the following, these techniques and systems are implemented to generate suggestions that are usable to guide a creative professional in updating an image. For example, the content sharing service monitors which images are licensed for use from the service. The content sharing service may then analyze these images to determine characteristics shared by the images.

These characteristics are then used to generate suggestions such as based on comparison with images of a user to note whether the images exhibit those characteristics, and if not, make suggestions. For example, images currently being licensed from the content sharing service may exhibit use of a sepia filter and therefore use of this filter may be suggested to update images that have not used this filter. In this way, images captured by a user may be updated to increase a likelihood of being licensed through a content sharing service, thereby making increasing a number of images that are potentially of interest to customers of the service, increase a value of an investment made by a creative professional in capturing the images, and improve a user's experience with the service. Further discussion of these and other examples are described in the following sections.

In the following discussion, an example environment is first described that is configured to employ the image creation suggestion techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. A digital medium environment is illustrated that is configured to generate and control suggestions usable to guide content updates. The illustrated environment 100 includes a content creation service 102, a content sharing service 104, a content social network service 106, a marketing and analytics service 108, and a client device 110 that are communicatively coupled, one to another, via a network 112. Although illustrated separately, functionality represented by the content creation service 102, the content sharing service 104, the content social network service 106, and the marketing and analytics service 108 are also combinable into a single entity, may be further divided across other entities that are communicatively coupled via the network 112, and so on.

Computing devices that are used to implement the content creation service 102, the content sharing service 104, the content social network service 106, the marketing and analytics service 108, and the client device 110 are configurable in a variety of ways. Computing devices, in one such instance, are configured as a desktop computer, a laptop computer, a mobile device (e.g., assuming a handheld configuration such as a tablet or mobile phone), and so forth. Thus, computing devices range from full resource devices with substantial memory and processor resources (e.g., personal computers, game consoles) to a low-resource device with limited memory and/or processing resources (e.g., mobile devices). Additionally, although a single computing device is shown in some instances, computing devices are also representative of a plurality of different devices, such as multiple servers utilized by a business to perform operations "over the cloud" as shown for the content creation service 102, the content sharing service 104, the content social network service 106, the marketing and analytics service 108, further discussion of which may be found in relation to FIG. 7.

The content creation service 102 is illustrated as including a content creation manager module 114 that is representative of functionality that is available via the network 112 to create and store content 116. The content creation manager module 114 provides a variety of functionality that is related to the creation of content 116. Examples of this functionality include graphic design, video editing, web development, image creation and processing, sound data processing, photography, and so forth. For example, functionality supported by the content creation manager module 114 includes digital motion graphics and compositing applications, digital audio editors, GUI web development application, animation design, web design, multimedia authoring applications, application-authoring applications, a vector graphics editor, desktop publishing applications, webpage and web development applications, raster-graphics editing applications, a real-time timeline-based video editing application, and so forth.

The content sharing service 104 includes a sharing manager module 118. The sharing manager module 118 is representative of functionality to unite content of creative professionals with consumers of the content, such as marketers, via an online service. An example of this is the content sharing service Fotolia® by Adobe®, via which images are made available, e.g., via licensing, for users of the service. The images, for instance, may be made available as stock photos, including macro-stock images that are generally high-priced and exclusive, micro-stock which is relatively low priced and made available to wide range of consumers, and mid-stock which is priced between the two. Functionality of the sharing manager module 118 may include support of searches to locate desired images, pricing techniques, digital rights management (DRM), and generation of content update suggestions, further discussion of which begins in relation to FIG. 2 in the following.

The content social network service 106 as illustrated includes a social network manager module 120 that is representative of functionality to implement and manage a content social network service. An example of this is an online social-media based portfolio service for content creators (e.g., Behance®) that is usable by consumers to locate content professionals through examples of content created by the professionals.

The environment 100 also includes a marketing and analytics service 108. The marketing and analytics service 108 includes a marketing manager module 122 that is representative of functionality involving creation and tracking of marketing campaigns and the analytics manager module 124 is representative of functionality to analyze "big data," e.g., posts from a social network service. For example, marketing activities may be utilized to increase awareness of a good or service. This includes making potential consumers aware of the good or service as well as making the potential consumers aware of characteristics of the good or service, even if the potential consumers already own the good. An advertiser, for instance, generates a marketing activity to indicate functionality that is available from the good or service to increase usage and customer satisfaction.

Marketing activities take a variety of different forms, such as online marketing activities may involve use of banner ads, links, webpages, online videos, communications (e.g., emails, status posts, messaging), and so on that may be accessed via the Internet or otherwise. Marketing activities are also be configured for use that does not involve the Internet, such a physical fliers, television advertising, printed advertisements, billboard display (e.g., at a sporting event or along a side of a road), and so forth.

The marketing manager module 122 includes functionality to configure content 116 for inclusion as part of a marketing activity as well as track deployment of the content 116 as part of the marketing activity. The marketing manager module 122, for instance, may embed digital rights management functionality (e.g., a tracking monitor) to track the deployment of the content 116, e.g., to determine a number of times accessed by potentials customers, how and when accessed, identities of who accessed the content, and so forth as processed by the analytics manager module 124.

The client device 110 is illustrated as including a communication module 126 that is representative of functionality to access the content creation service 104, content sharing service 104, content social network service 106, marketing and analytics service 108, and/or content 116 (e.g., available at an online store) via the network 112. The communication module 126, for instance, may be configured as a browser, a web-enabled application, and so on. As such the client device 110 may be utilized by creative professionals to create the content 116, consumers of the content sharing service 104 to gain rights to use the content 116 (e.g., marketers), consume the content 116 (e.g., as part of viewing a marketing activity), and so forth. A variety of other arrangements of functionality represented by the entities of the environment 100 of FIG. 1 are also contemplated without departing from the spirit and scope thereof Having now described an environment that is usable to implement the techniques described herein, examples of the content creation suggestion techniques are described in the following.

Figure 2:
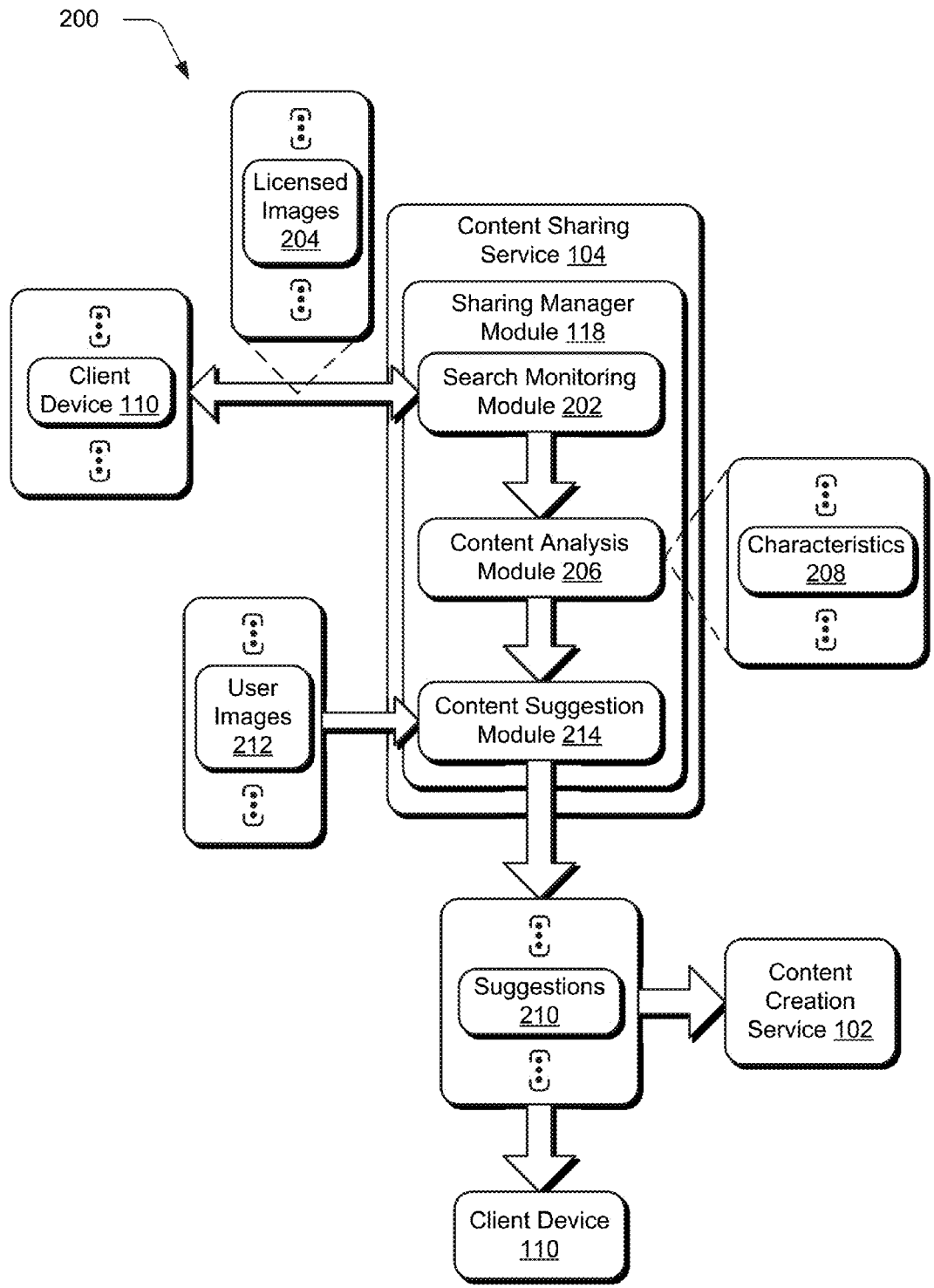
FIG. 2 depicts a system in which update suggestions are based on shared characteristics of images obtained by users of a content sharing service.
Figure 3:
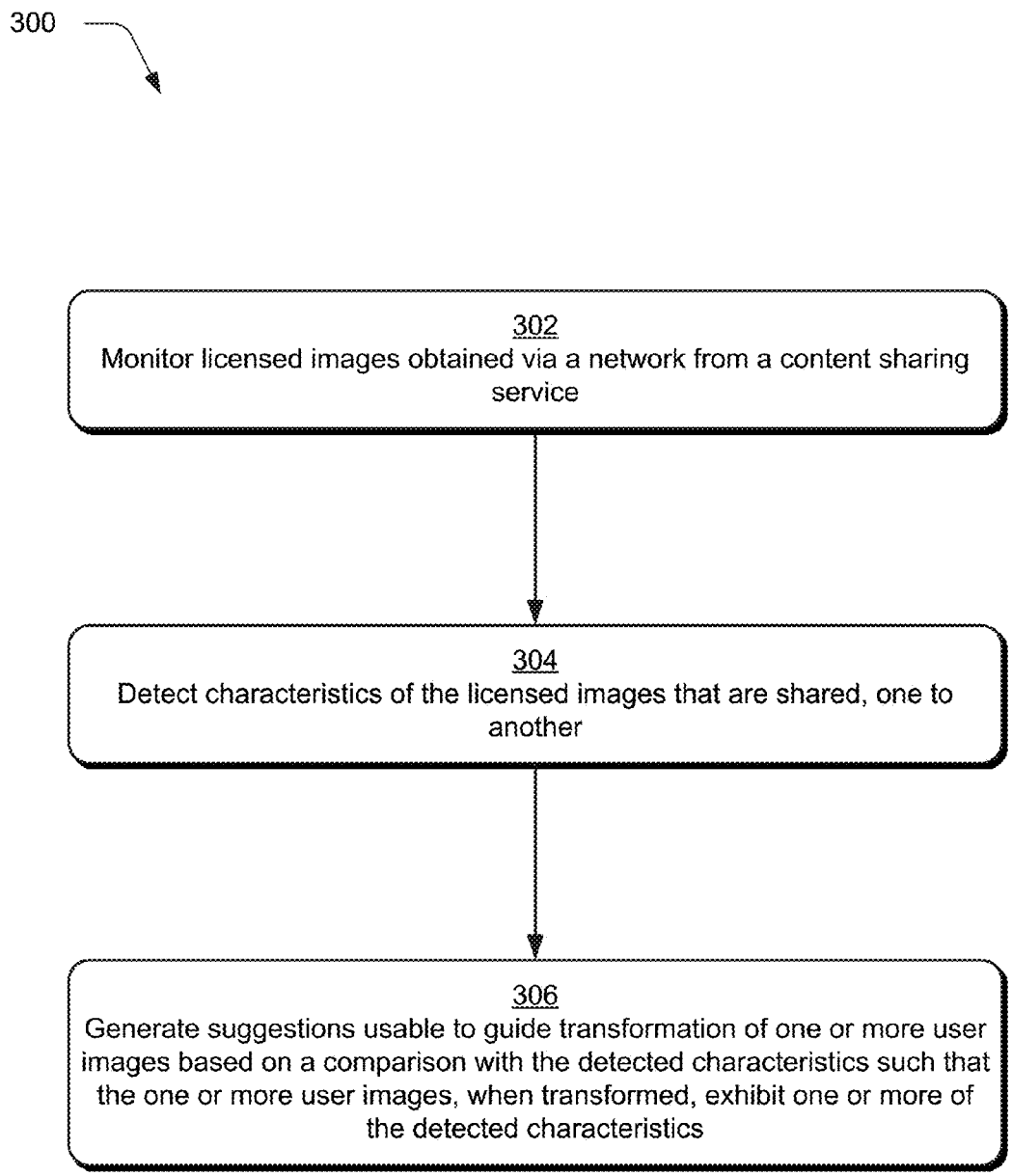
FIG. 3 is a flow diagram depicting a procedure in an example implementation in which update suggestions are based on shared characteristics of images obtained by users of a content sharing service.

FIG. 2 depicts a system 200 and FIG. 3 depicts a procedure 300 in an example implementation in which update suggestions are based on shared characteristics of images obtained by users of a content sharing service 104. The content sharing service, for instance, may determine which images are actually obtained (e.g., licensed) by users and characteristics of those images. These characteristics are then exposed as suggestions to guide an update of a user's images and thereby increase a likelihood that the images are of interest to customers of the content sharing service 104. In the following, reference is made interchangeably to both FIGS. 2 and 3.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

Suggestions may be used to bridge a gap between characteristics of content already created by a content professional and the characteristics of content currently being desired by consumers of the content, e.g., a marketing professional. In this example, the suggestions are based on shared characteristics of images obtained by users of a content sharing service 104, e.g., licensed by the users for use as part of a marketing campaign.

To start, licensed images are monitored that are obtained via a network from a content sharing service (block 302), such as licensed as part of a subscription, pay-per-use, and so on. As illustrated in FIG. 2, for instance, a search monitoring module 202 is used to perform searches to locate licensed images 204 desired by users of client devices 110, such as marketing professionals as part of a marketing campaign, casual or business users for limited used (e.g., as part of a slide deck), and so on. The searches may be performed in a variety of ways, such as to match keywords included in a search query with tags associated with the images 204, use of an exemplar to find similar images, and so forth.

Characteristics that are shared by the obtained images, one to another, are then detected (block 304). A content analysis module 206, for instance, may detect characteristics 208 of the licensed images 204 and then determine which characteristics, if any, are shared by the licensed images 204, e.g., over a threshold amount. A variety of characteristics may be shared by the licensed images 204. For example, the shared characteristics may include use of similar themes, colors, treatments, visual effects, and so on. In another example, the characteristics 208 involve how or where the licensed images 204 are generated. This may include whether the licensed images 204 are captured by an image capture device, a particular brand of image capture device, settings used in the capturing of the images, and so on.

This may also include whether the images are created "from scratch" virtually or processed by a creative professional, tools used in the creation, image filters and effects applied to the image, and so on. The licensed images 204, for instance, may be processed by the content creation service 102 to alter pixels included in the images 202. The content analysis module 208 may then determine how those pixels were altered, e.g., which filters were applied, through analysis of the image itself, metadata associated with the image, and so on as further described in relation to FIGS. 4-6.

A variety of other examples are also contemplated, such as to perform object identification to identify animate (e.g. particular human faces) or inanimate objects. In this way, the characteristics 208 pertain to particular objects included in respective licensed images 204 and the processing may be performed to update how those objects appear in respective images.

Suggestions 210 are then generated to guide transformation of one or more user images based on a comparison with the detected characteristics 208 such that the one or more user images 212, when transformed, exhibit one or more of the detected characteristics 208 (block 306). A content suggestion module 214, for instance, may receive the characteristics 208 identified by the content analysis module 206 and generate the suggestions 210 based on these characteristics 208.

Continuing with the previous example, the content suggestion module 214 may leverage characteristics 208 that describe appearance of common objects included in the licensed images 204 and output suggestions 210 identifying the appearance of those objects. The characteristics 208, for instance, may identify colors of shoes included in the licensed images 204 and the suggestions 210 also identify those colors for use in user images 212 having shoes. Accordingly, a user interacting with a content creation service 102 may employ image transformation functionality to change a color of the shoes in the user images 212, thereby increasing a likelihood of being found interesting and the licensed for use from the content sharing service.

In another example, the characteristics 208 describe similarity of clustered licensed images 204 as a whole. For example, the content analysis module 206 may further cluster the licensed images 204 based on similarity, one to another. This may be performed through use of metrics that describe the licensed images 204, such as colors used, subject matter, composition, and so forth, expressed as multidimensional vectors.

These clusters are then used as a basis for both comparison with similar user images 212 and also to determine characteristics 208 that differ between the licensed images 204 and the user images 212 in order to generate the suggestions 210. For instance, a cluster for "outdoor landscape sunrise images" may be formed from the licensed images 204 and compared with similar user images 212. As part of this comparison, the content suggestion module 214 may determine characteristics of the licensed images 204 that are lacking in the user images 212, such as colors in the sunrise. This is then used by the content suggestion module 214 to generate suggestions 210 to change the color of the sunrise in the user images 212. Other instances are also contemplated, such as use of textures, treatments, and so forth.

The content suggestion module 214 may also determine common characteristics 208 such as devices (e.g., particular cameras or lens) or processing performed on the images (e.g., image filters, tools, and effects) and identify these devices or effects as suggestions 210. In this way, the suggestions 210 may describe characteristics of "what is popular" that are usable to guide a creative professional in updating the user images 212 and thus increase a likelihood of the user images 212 gaining or regaining popularity.

Exposure of the generated suggestions 210 may then be controlled via a user interface by the one or more computing devices. The suggestions 210, for instance, may be output to a marketing and analytics service 108 to guide creation of content for a marketing campaign. The suggestions 210 may also be communicated to a content creation service 102 for output as part of a content update process. A creative professional, for instance, may provide one or more inputs describing content to be updated (e.g., outdoor landscape of a sunrise) based on suggestions 210 on how to perform this update, e.g., to change to a particular color. The suggestions 210 may also be output to one of the client devices 110 that originated a search, e.g., to suggest similar characteristics for content to be created based on what images 202 are being searched for a user. In this way, the suggestions 210 are usable to guide a creative professional in updating user images 212 in a variety of ways. The suggestions 210 may also be based, at least in part, on metadata associated with the licensed images 204 that describes how the images are created, further discussion of which is included in the following.

Figure 4:
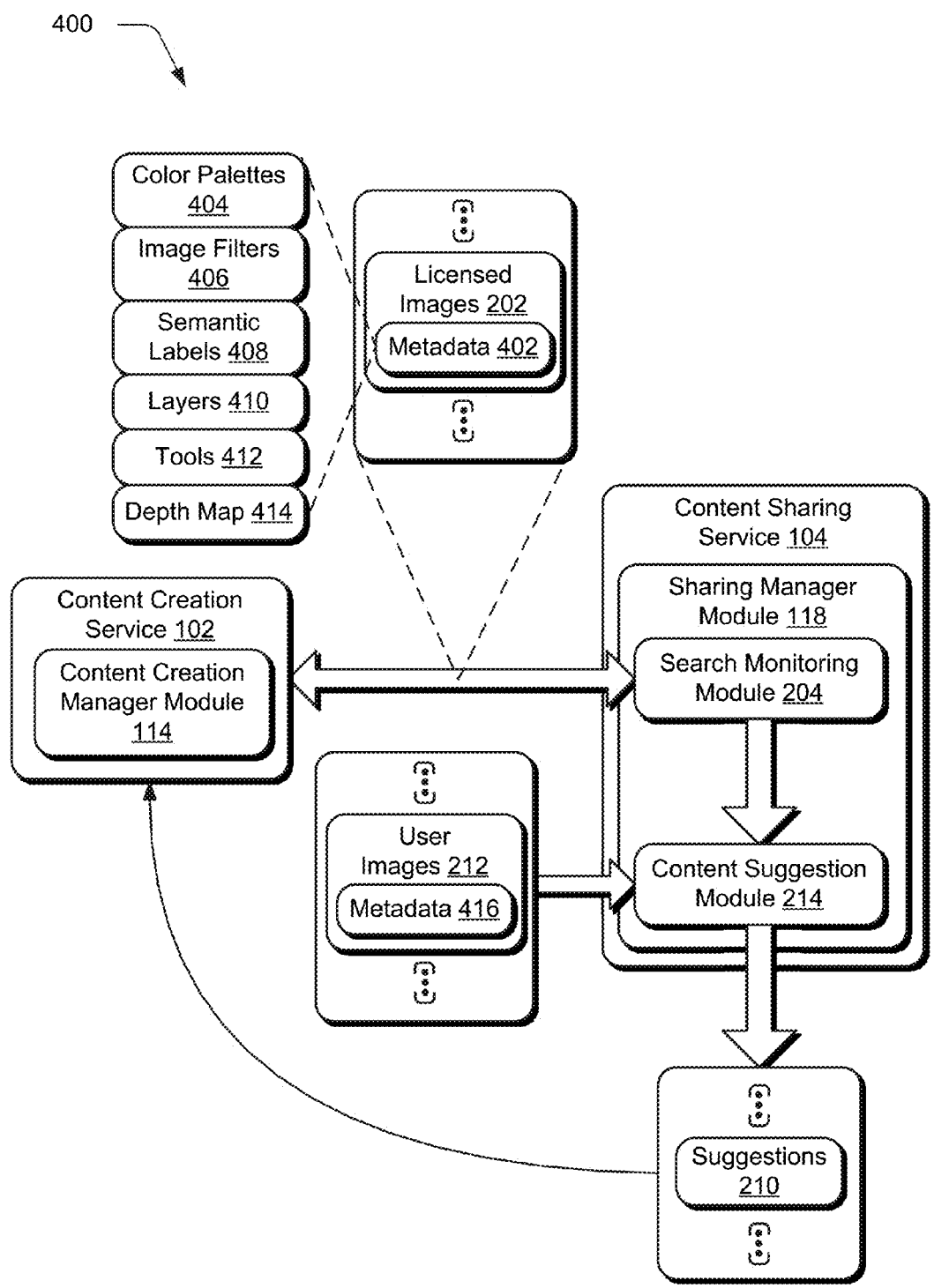
FIG. 4 depicts a system in which update suggestions are based on metadata that describes creation of licensed images of a content sharing service.
Figure 5:
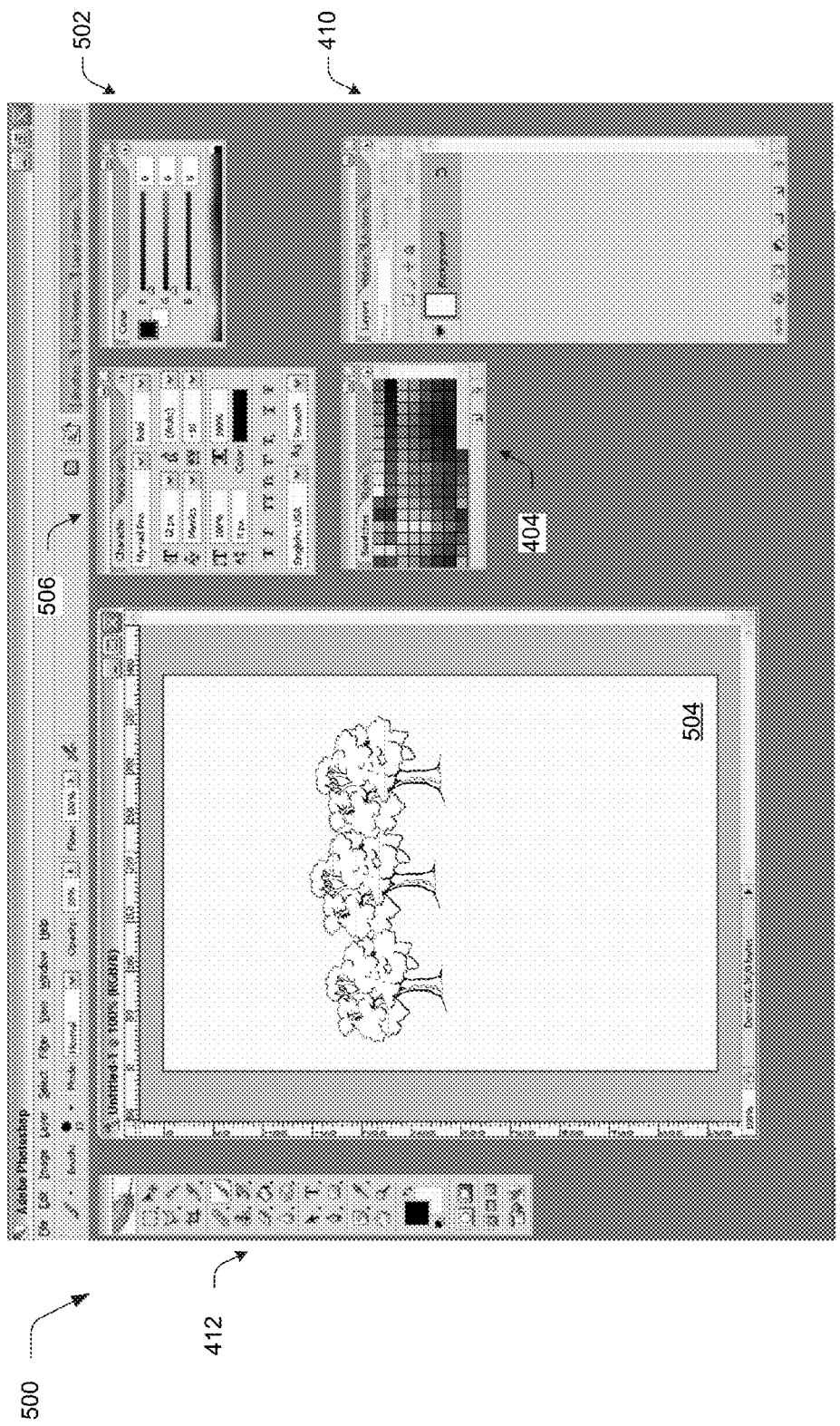
FIG. 5 depicts an example of a user interface of a content creation service that is usable to create and transform content.
Figure 6:
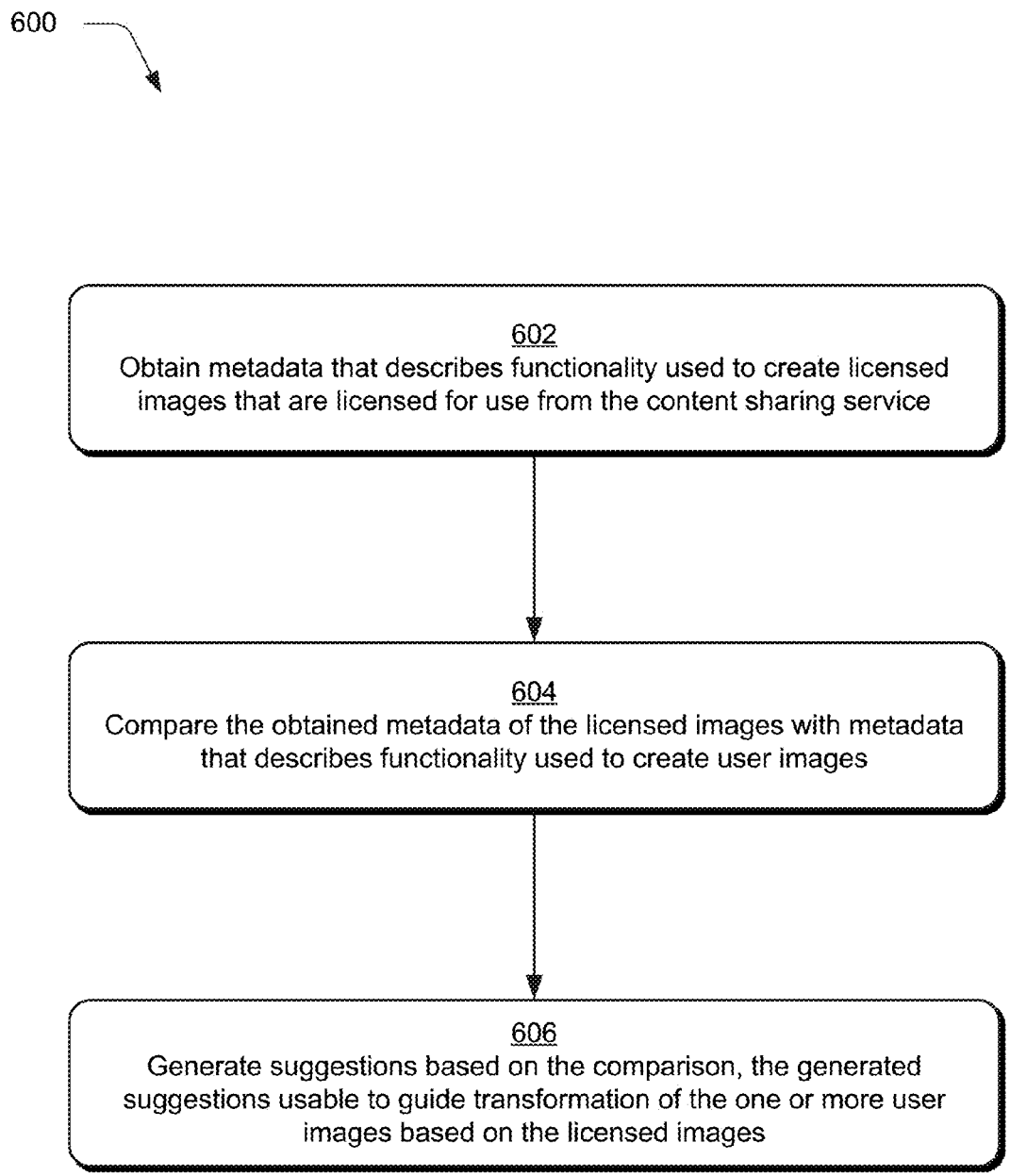
FIG. 6 is a flow diagram depicting a procedure in an example implementation in which update suggestions are based on metadata that describes creation of licensed images of a content sharing service.

FIG. 4 depicts a system 400, FIG. 5 depicts a user interface 500, and FIG. 6 depicts a procedure 600 in an example implementation in which update suggestions are based on metadata that describes creation of licensed images 202 of a content sharing service 104. The content sharing service, for instance, may determine which images are actually obtained (e.g., licensed) by user. Metadata that is associated with the licensed images is then exposed as suggestions to guide an update of a user's images and thereby increase a likelihood that the images are of interest to customers of the content sharing service 104. In the following, reference is made interchangeably to FIGS. 4-6.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

In this example, a creative professional interacts with the content creation service 102 to create images, which are then licensed by the content sharing service 104 and therefore are described as "licensed images 202" in the following. In order to support this creation, the content creation manager module 114 of the content creation service 102 includes image creation functionality that is accessible via a user interface to create images in this example although other types of content are also contemplated, e.g., sound data, multimedia presentations, video. Metadata 402 is associated with the licensed images 202 that describes which image creation functionality is used to create the licensed images 202 and thus describes how the image is created.

The image creation functionality is configurable in a variety of ways and supports a variety of different techniques usable to transform an image in this instance. In one example, the image creation functionality includes color palettes 404 that are used as a basis to select colors for inclusion as part of the content. As shown in a user interface 500 of FIG. 5, for instance, the color palettes 404 are usable to select colors used by brushes, to fill shapes, outlines, pen strokes, and so on. The user interface 500 may also include functionality to modify 502 the colors included in the palette, such as to blend colors together, specify color temperatures, and so on.

In another example, the image creation functionality includes one or more image filters 406 that are applied to the image 504 to transform an appearance of the image 504. For example, the image filters may be used to apply effects such as blur, retro effects, redeye removal, motion effects, swirl effects, and so forth through modification of the colors of individual pixels of the image 504.

In a further example, the image creation functionality includes semantic labels 408 that identify objects included in the image 504. The semantic labels 408, for instance, may be associated with each pixel in the image 504 to identify an object associated with the pixel. Examples of semantic labels 504 include sky, ground, standing object, type of object (e.g., car), textures, and so forth. In this way, pixels describing one object in the image may be differentiated from pixels that describe other objects in the image. Further, the semantic labels 408 describe "what is being represented" by the pixels, which may also be leveraged to support a variety of functionality, such as to suggest application of corresponding image creation functionality based on a type of object represented, object removal, object duplication, and so forth.

In yet another example, the content creation manager module 114 includes layer 410 functionality used as part of creating the image 504. As shown in the user interface 500, the layers 410 correspond to objects of the image 504, such as a background for the image 504. In this way, a user may create, interact, and modify objects individually through use of the different layers which are then displayed together (e.g., one over the other) to form the image 504.

In an additional example, the content creation manager module 114 includes image creation tools 412 used to create the image 504. Examples of such tools as shown in the user interface 500 of FIG. 5 include user selection tools, color selection tools, cropping tools, slicing tools, clone stamping tools, brush tools, pencil tools, gradient tools, blur tools, dodge tools, path selection tools, pen tools, foreground color change tools, and others that are configured to change, select, modify, or move pixels of the image 504.

In other examples, the content creation manager module 114 is configured to support a depth map 414 of the image 504. The depth map 414 is configured to describe a relative or absolute depth of one or more objects included in the image, which may be used to improve accuracy for object addition, removal, improvement of consistency of hole filling, scene lighting, and so forth. The depth map 414 may be virtually generated, formed using a depth sensor of an image scene captured by the image 504, based on stereo correspondence, and so forth. A variety of additional examples are also contemplated, such as to describe fonts 506 used in image creation, border, frames, and so forth.

In this system 400, the content creation manager module 114 is configured to generate and associate metadata 402 with the licensed images 202 that describes image creation functionality used by the creative professional to create the image 202. The image 216, along with the metadata 402 are communicated to the content sharing service 104 to be made available for licensing. In this way, the content creation manager module 114 is configured to preserve valuable information describing how the image 216 is created. In this example, this metadata 402 is used as a basis to generate suggestions 210 to update user images 202 as further described below.

Similar to the previous example of FIGS. 2-3, a search monitoring module 204 monitors which licensed images 202 are licensed for use from the content sharing service 104. Based on this monitoring, metadata is then obtained that describes functionality used to create licensed images that are licensed for use from a content sharing service 104 (block 602). In this way, the sharing manager module 118 is able to determine which images are actually desired by customers based on actual purchases as well as how those images are created.

The obtained metadata of the licensed images is compared with metadata that describes functionality used to create user images (block 604). The content suggestion module 214, for instance, may compare the metadata 402 of the licensed images 202 with metadata 416 of a user's images 212, e.g., made available via the content sharing service 104, stored as part of the content creation service 102, and so forth. In this way, differences between the licensed images 202 that are currently desired by users of the content sharing service 104 (e.g., within a threshold time period, weighted based on when purchased, and so forth) and the user images 212 may be readily determined by this comparison.

Suggestions are then generated based on the comparison, the generated suggestions usable to guide transformation of the one or more user images based on the licensed images (block 606). The suggestions 210, for instance, may be generated automatically and without user intervention to indicate a particular color palette 404 to use, image filters 406, leverage semantic labels 408, indications of objects in layers 410, tools 412 used, depth maps 414 that indicate an environment captured by the image, and so on. In this way, the suggestions 210 are usable to guide transformation of the user images 212, e.g., to include characteristics found desirable in the licensed images 202. A variety of other examples are also contemplated without departing from the techniques and system described herein.

Example System and Device

Figure 7:
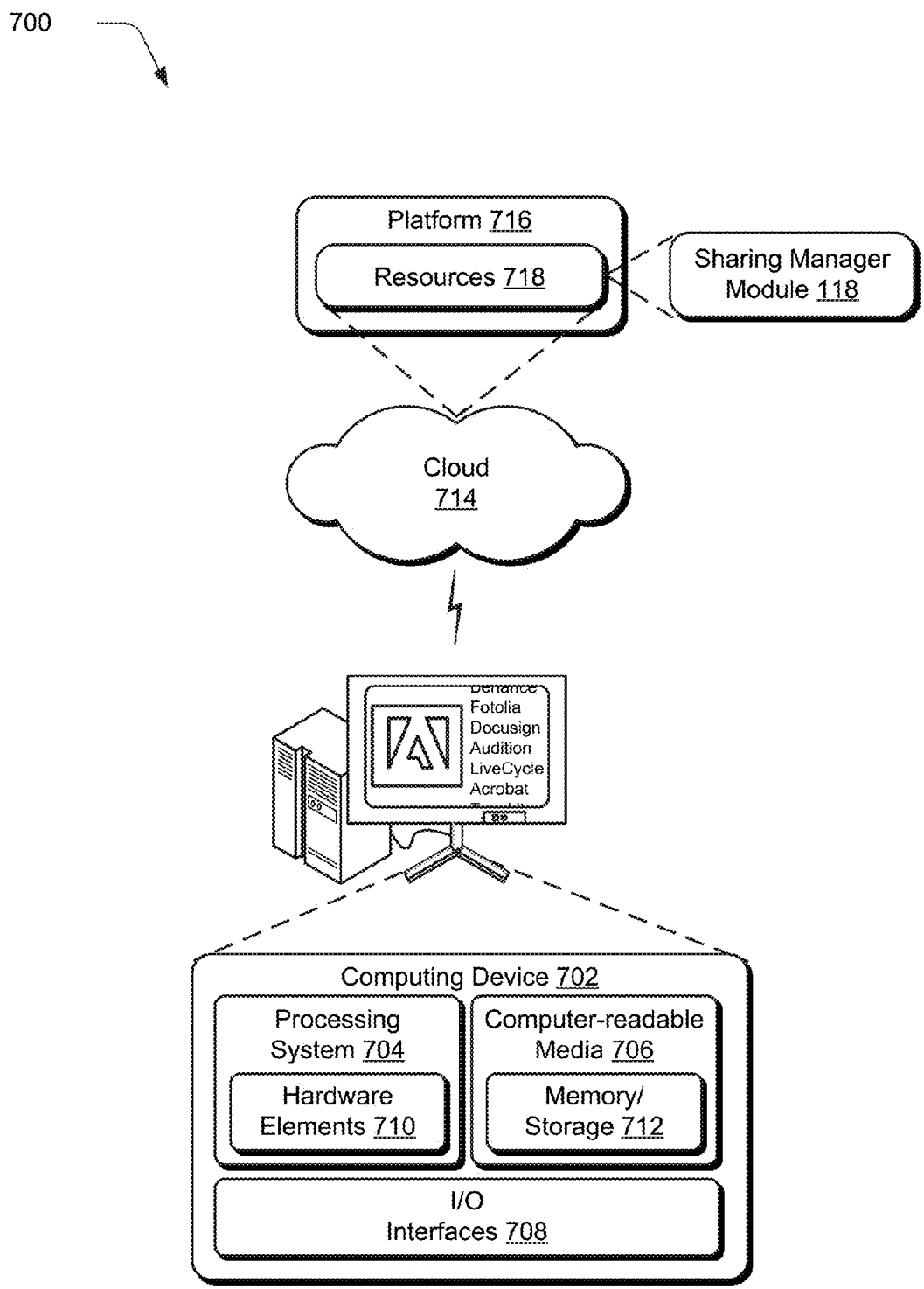
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the sharing manager module 118. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for controlling image creation suggestions to update a user image based on licensed images that are licensed from a content sharing service, a system comprising:
   a search monitoring module implemented at least partially in hardware of at least one computing device to monitor the licensed images obtained via a network from the content sharing service;
   a content analysis module implemented at least partially in hardware of the at least one computing device to detect a characteristics of the licensed images that is shared, one to another, automatically and without user intervention;
   a content suggestion module implemented at least partially in hardware of the at least one computing device to generate a suggestion, automatically and without user intervention, based on a comparison of the user image with the detected characteristic; and
   a content creation manager module implemented at least partially in hardware of the at least one computing device to output the generated suggestion in a user interface to guide transformation of the one or more of the user images to exhibit the detected characteristic.

2. The system as described in claim 1, wherein the content sharing service makes the plurality of licensed images available to the users by licensing rights to use respective said images.

3. The system as described in claim 1, wherein content suggestion module is further configured to expose the generated suggestions via a user interface as part of the content sharing service or a user interface as part of a content creation service to transform the one or more user images.

4. The system as described in claim 1, wherein the detected characteristics involves characteristics of pixels of respective said licensed images and the suggestions describes how to apply the characteristics as part of transforming the one or more user images.

5. The system as described in claim 1, wherein the detected characteristics involves image filters applied to the licensed images and the suggestions identifies the image filters.

6. The system as described in claim 1, wherein the detected characteristics involves image tools applied to the licensed images and the suggestion identifies the image tools.

7. The system as described in claim 1, wherein the detected characteristics involves a setting used to capture the licensed images by respective image capture devices.

8. The system as described in claim 1, wherein the detected characteristic pertains to particular objects included in respective said licensed images and the suggestion describes the characteristic of the particular objects.

9. In a digital medium environment for controlling image creation suggestions to update a user images available for licensing based on licensed images that are licensed from a content sharing service, a method implemented by one or more computing devices comprising:
obtaining metadata, by the one or more computing devices, that describes functionality used to create the licensed images that are licensed for use from the content sharing service;
comparing the obtained metadata of the licensed images by the one or more computing devices with metadata that describes functionality used to create the user images; and
generating a suggestions, by the one or more computing devices, based on the comparison automatically and without user intervention, the generated suggestion usable to guide transformation of the user image based on the licensed images.

10. The method as described in claim 9, further comprising controlling exposure of the generated suggestions via a user interface as part of the content sharing service or a user interface as part of a content creation service to transform the user image.

11. The method as described in claim 9, wherein the obtained metadata describes characteristics of pixels of respective said licensed images and the suggestion describes how to apply those characteristics as part of transforming the user image.

12. The method as described in claim 9, wherein the obtained metadata describes an image filters applied to the licensed images and the suggestion identifies the image filter.

13. The method as described in claim 9, wherein the obtained metadata describes image tools applied to the licensed images and the suggestion identifies the image tool.

14. The method as described in claim 9, wherein the obtained metadata involve describes used to capture the licensed images by respective image capture devices.

15. In a digital medium environment for updating a user's image available for licensing based on other images that are licensed from a content sharing service, a method implemented by one or more computing devices comprising:
obtaining a suggestion, by the one or more computing devices, that is usable to guide transformation of one or more images, the suggestions generated based on a characteristic detected for other images that are licensed from the content sharing service; and
exposing, by the one or more computing device, a user interface as including the obtained suggestion and configured to transform one or more user images based on the obtained suggestion such that the one or more user images, when transformed, exhibit the detected characteristics of the other images.

16. The method as described in claim 15, wherein the detected characteristic involves characteristics of pixels of respective said other images and the suggestion describe how to apply those characteristics as part of transforming the one or more user images.

17. The method as described in claim 16, wherein the detected characteristic involves an image filter applied to the other images and the suggestion identifies the image filter.

18. The method as described in claim 16, wherein the detected characteristic involves an image tool applied to the other images and the suggestion identifies the image tool.

19. The method as described in claim 15, wherein the detected characteristics involves a characteristic pertaining to a particular object included in respective said other images and the suggestion describe the characteristic of the particular object.

20. The method as described in claim 15, wherein the detected characteristic involves a setting used to capture the other images by respective image capture devices.

* * * * *

UNITED STATES PATENT AND TRADEMARK OFFICE
CERTIFICATE OF CORRECTION

PATENT NO. : 9,818,044 B2
APPLICATION NO. : 14/938781
DATED : November 14, 2017
INVENTOR(S) : Koch et al.

Page 1 of 1

It is certified that error appears in the above-identified patent and that said Letters Patent is hereby corrected as shown below:

In the Claims

Column 12, Line 55, Claim 1 delete "characteristics", insert -- characteristic --, therefor.
Column 13, Line 7, Claim 3 delete "suggestions", insert -- suggestion --, therefor.
Column 13, Line 11, Claim 4 after "detected", delete "characteristics", insert -- characteristic --, therefor. (First Occurrence)
Column 13, Line 12, Claim 4 delete "suggestions", insert -- suggestion --, therefor.
Column 13, Line 13, Claim 4 delete "characteristics", insert -- characteristic --, therefor.
Column 13, Line 16, Claim 5 delete "characteristics", insert -- characteristic --, therefor.
Column 13, Line 17, Claim 5 delete "suggestions", insert -- suggestion --, therefor.
Column 13, Line 20, Claim 6 delete "characteristics", insert -- characteristic --, therefor.
Column 13, Line 24, Claim 7 delete "characteristics", insert -- characteristic --, therefor.
Column 13, Line 31, Claim 9 delete "images", insert -- image --, therefor.
Column 13, Line 42, Claim 9 delete "images", insert -- image --, therefor.
Column 13, Line 43, Claim 9 delete "suggestions", insert -- suggestion --, therefor.
Column 13, Line 49, Claim 10 delete "suggestions", insert -- suggestion --, therefor.
Column 14, Line 7, Claim 12 delete "filters", insert -- filter --, therefor.
Column 14, Line 23, Claim 15 delete "suggestions", insert -- suggestion --, therefor.
Column 14, Line 31, Claim 15 delete "characteristics", insert -- characteristic --, therefor.
Column 14, Line 34, Claim 16 delete "describe", insert -- describes --, therefor.
Column 14, Line 44, Claim 19 delete "characteristics", insert -- characteristic --, therefor. (First Occurrence)
Column 14, Line 46, Claim 19 delete "describe", insert -- describes --, therefor.

Signed and Sealed this
Third Day of July, 2018

Andrei Iancu
*Director of the United States Patent and Trademark Office*